(12) United States Patent
Lehtinen et al.

(10) Patent No.: US 7,682,581 B2
(45) Date of Patent: Mar. 23, 2010

(54) METHOD FOR THE REMOVAL OF COPPER FROM A ZINC SULPHATE SOLUTION

(75) Inventors: Leena Lehtinen, Pori (FI); Marko Lahtinen, Pori (FI); Marika Jyrälä, Pori (FI); Matti Vuokko, Pori (FI)

(73) Assignee: Outotec Oyj, Espoo (FI)

( * ) Notice: Subject to any disclaimer, the term of this patent is extended or adjusted under 35 U.S.C. 154(b) by 614 days.

(21) Appl. No.: 10/577,678

(22) PCT Filed: Oct. 22, 2004

(86) PCT No.: PCT/FI2004/000629

§ 371 (c)(1), (2), (4) Date: Apr. 28, 2006

(87) PCT Pub. No.: WO2005/045078

PCT Pub. Date: May 19, 2005

(65) Prior Publication Data

US 2007/0048203 A1 Mar. 1, 2007

(30) Foreign Application Priority Data

Nov. 7, 2003 (FI) .................................. 20031615

(51) Int. Cl.
*B01D 15/08* (2006.01)
*C25C 1/16* (2006.01)

(52) U.S. Cl. .................... 423/24; 423/100; 205/607; 210/688

(58) Field of Classification Search ................. 205/602, 205/604, 607; 423/24, 100, 335–340; 210/660–681, 210/688

See application file for complete search history.

(56) References Cited

U.S. PATENT DOCUMENTS

| 2,954,276 A | | 9/1960 | Hazen | |
|---|---|---|---|---|
| 3,682,589 A | | 8/1972 | Moore | |
| 4,004,174 A | * | 1/1977 | Yashiro | ...................... 378/144 |
| 4,005,174 A | * | 1/1977 | Bodson | ...................... 423/43 |
| 4,150,976 A | | 4/1979 | Dain | |
| 4,355,009 A | * | 10/1982 | Stewart | ...................... 423/101 |

(Continued)

FOREIGN PATENT DOCUMENTS

AU 536376 * 11/1982

(Continued)

OTHER PUBLICATIONS

English translation of DD 9604.*

(Continued)

*Primary Examiner*—Roy King
*Assistant Examiner*—Brian Walck
(74) *Attorney, Agent, or Firm*—Chernoff, Vilhauer, McClung & Stenzel (57) ABSTRACT

The purpose of the invention is to remove copper selectively from a concentrated zinc sulphate solution by ion exchange. The method enables a significant reduction in the use of zinc powder during the solution purification of zinc sulphate solution and makes possible to avoid usage of arsenic or antimony trioxides as a precipitation chemical. The method is to be combined with the chloride removal that occurs as a sub-stage of solution purification.

26 Claims, 5 Drawing Sheets

U.S. PATENT DOCUMENTS 4,943,375 A * 7/1990 Bradshaw et al. ........... 210/674
4,963,264 A 10/1990 Davis
5,182,026 A * 1/1993 Pike ........................... 210/688
5,190,660 A * 3/1993 Lindoy et al. ............... 210/670

FOREIGN PATENT DOCUMENTS

| DE | 9604 | * | 4/1955 |
| DE | 2646857 | | 11/1977 |
| SU | 1206327 | | 1/1986 |
| WO | 0134856 | | 5/2001 |

OTHER PUBLICATIONS

Owusu, George. "Selective extraction of copper from acidic zinc sulfate leach solution using LIX 622." Hydrometallurgy 51 (1998), pp. 1-8.*

Robert J. Fischer et al, "Silica-Polyamine Composite Materials for Heavy Metal Ion Removal, Recovery, and Recycling. II. Metal Ion Separations from Mine Wastewater and Soft Metal Ion Extraction Efficiency," Separation Science and Technology, vol. 34, No. 16, 1999, pp. 3125-3137.

* cited by examiner

METHOD FOR THE REMOVAL OF COPPER FROM A ZINC SULPHATE SOLUTION

This is a national stage application filed under 35 USC 371 based on International Application No. PCT/FI2004/000629 filed Oct. 22, 2004, and claims priority under 35 USC 119 of Finnish Patent Application No. 20031615 filed Nov. 7, 2003.

FIELD OF THE INVENTION

The invention relates to a method of removing copper from a chloride-containing zinc sulphate solution. The zinc sulphate solution is formed by leaching zinc-containing material by means of a solution containing sulphuric acid. The zinc sulphate solution that is generated is routed to solution purification, of which the first stage is copper removal.

BACKGROUND OF THE INVENTION

In a hydrometallurgical zinc production process, a zinc-containing ore is concentrated, roasted and leached into sulphuric acid. At least some of the zinc concentrate can also be leached directly without roasting. In addition to zinc, copper, cobalt, nickel and cadmium are also released during leaching. Traditionally these metals or impurities are removed or separated from the concentrated zinc sulphate solution by reduction with zinc powder in the solution purification process. In addition to zinc powder arsenic or antimony trioxide is utilized as a reagent to precipitate these metals out from the solution. The separation of metals can be carried out in one or several stages in precipitation reactors or the equivalent. After removal of the above-mentioned metals, zinc is reduced from the solution electrolytically. Impurities must be removed from the zinc sulphate solution in the solution purification stages, so that successful and effective electrolysis can be achieved to reduce the zinc. The zinc raw material may also include chloride and this has to be removed from the zinc sulphate solution to a certain level before electrolysis, where it would create problems of corrosion and work hygiene.

The separation of copper from the zinc sulphate solution is important, because copper is precipitated with zinc onto the cathode in electrolysis, causing impure zinc. In addition, copper may cause the generation of local couples, which reduces the current efficiency. Conventionally copper is cemented with zinc powder either in a separate copper removal stage or together with cobalt and cadmium. Cementation is an electrochemical exchange reaction, where the more precious metal is precipitated and the baser metal dissolves. When copper is precipitated in a separate stage, it is preferable to leave a small amount of copper in the solution for the following solution purification stages, because a small amount of copper is beneficial especially in the cobalt precipitation stage. The following reactions occur in the copper cementation stage:

$$CuSO_4 + Zn \rightarrow ZnSO_4 + Cu \quad (1)$$

$$CuSO_4 + Cu + H_2O \rightarrow + Cu_2O + H_2SO_4 \quad (2)$$

$$2CuSO_4 + Zn + H_2O \rightarrow + Cu_2O + ZnSO_4 + H_2SO_4 \quad (3)$$

The copper precipitate can be used as raw material in a copper smelter for example.

The second stage of solution purification is generally the separation of cobalt and nickel. Zinc powder is often used in this stage in addition to arsenic and antimony compounds as extra reagents. Nickel and cobalt precipitation, however, require the presence of copper in the solution. The final purification stage is usually the removal of cadmium.

As mentioned above, the amount of chloride in the zinc sulphate solution has to be reduced to a certain level (in general to less than 200 mg/l) before the solution is routed to electrolysis. When the zinc sulphate solution is prepared from the concentrate, which is first roasted, most of the chlorine is already removed during roasting. The aim is to make a concentrate mixture from various kinds of concentrate where the Cl content of the solution generated does not rise too high. Since direct leaching processes without roasting have become so widespread, Cl removal has been and will continue to be an essential process stage.

The amount of zinc powder required in the solution purification of zinc sulphate solution is from 2-10% of the process output, depending on the plant. Thus the zinc consumed must be produced again in electrolysis, so that the demand for electricity is increased considerably. The amount of zinc produced is also correspondingly smaller.

Since the costs of preparing zinc a second time are considerable, various methods of reducing the amount of zinc powder used in cementation have been sought. EP patent application 134644 suggests that some kind of flocculant be introduced into the solution to improve the separation level of metal impurities and reduce the amount of zinc powder. Redox-potential regulation has also been used in an attempt to control the feed of a suitable amount of zinc powder, which is mentioned in U.S. Pat. No. 4,252,622.

AU patent 536376 mentions that in addition to zinc powder cementation, copper can be removed from a zinc sulphate solution by cementation with metallic iron, steel, sulphide precipitation or by precipitation as an alkaline sulphate, as well as liquid-liquid extraction and ion exchange. Apart from this sentence however, the patent does not describe any other method than zinc powder cementation.

In Ullmann's Encyclopedia of Industrial Chemistry, 5th Edition, VCH Verlagsgesellschaft & Co, Germany 1996, Vol. 28A, it is mentioned in the section on Zinc by Graf, G., p. 524, that the removal of metals more precious metals than zinc from a zinc sulphate solution using ion exchangers is still at the development stage.

U.S. Pat. No. 4,005,174 describes the removal of chloride from a zinc sulphate solution. In this method, monovalent copper is introduced into a zinc sulphate solution containing chloride that forms copper chloride at a pH of below 2.6, which then precipitates out of the solution. Monovalent copper is obtained in the solution by adding for instance copper (II)sulphate and zinc powder to the solution. Copper powder can be used in place of zinc powder. One alternative is to feed monovalent copper oxide Cu2O into the solution. When copper (I) oxide is fed directly into the solution, zinc powder is saved from the feed for the chloride removal stage. In this case, Cu2O is produced from the copper chloride generated in chloride removal e.g. using sodium hydroxide. After chloride removal, 0.5 g/l of divalent copper should remain in the solution, which is reduced using zinc powder to monovalent. The solution from Cl removal is routed to the copper removal stage and the soluble (divalent) copper generated during Cl removal is precipitated using zinc powder precipitation. For instance, the method is used in the handling of galvanization dusts and copper is not normally present in these processes.

PURPOSE OF THE INVENTION

The purpose of the method now developed is to remove copper selectively from a concentrated zinc sulphate solution with the kind of solid separating material that has a greater affinity to copper than to zinc. The method can be used to reduce the use of zinc powder significantly during the solution purification of zinc sulphate solution. Another advantage of the developed method is that it enables to avoid the usage of toxic precipitation reagents, i.e. arsenic and antimony oxides. The method is suitable for combining with chloride removal as a sub-stage in solution purification.

SUMMARY OF THE INVENTION

The essential features of the method according to the invention will be made apparent in the attached claims.

In the method according to the invention, copper is removed from a concentrated zinc sulphate solution using an ion exchanger or other solid selective separating material, which has a greater affinity to copper than to zinc.

Ion exchange is one way of separating and recovering metals in ion form from a solution. In the method, ion exchangers take certain ions out of the solution and release the equivalent amount of other ions in their place. The majority of organic ion-exchange resins on the market are poly (styrene-divinylbenzene)-based (PS-DVB) resins. Since the polymers in question have no natural ion-exchange properties, functional groups with ion-exchange properties must be added to them. One of the groups of organic ion-exchange resins is that of chelating ion-exchange resins, which have groups within their structure that can form complexes with certain metals. The majority of commercial chelating ion exchangers and other separating materials are polymer-based, where complex formers or chelating groups are fixed to their surface. Selective solid separating material usually means the type of materials that act and are used like ion exchangers, which do not literally take ions out of the solution and replace them with others, but instead the separating material may be selective for instance to some acid or salt. Thus the separating material may take sulphuric acid or copper sulphate for example out of the solution. Since the distinction between ion exchanger and selective separating material is at present unclear, the term ion exchanger will be used hereafter to refer to both groups.

Generally chelating resins are very selective towards both heavy metals and valuable metals. The term valuable metals in this context means both precious metals and other metals such as non-iron metals. In addition, chelating resins are expensive and kinetically slow. Some silica-based chelating ion exchangers that have been developed have long lifetime and they have a great dynamic capacity. They have been developed for the selective removal and separation of metals and metal complexes from aqueous and organic solutions.

One particularly important advantage of silica-based ion exchangers is that they neither swell nor shrink in salt solutions. They are therefore far more resistant to osmotic shock than polymeric ion exchangers, where swelling and shrinkage are problematic, especially in strong salt solutions. The fact that the volume remains unchanged is also an important benefit when the ion exchange process takes place in columns. With silica-based ion exchangers, there is no need to leave empty space in the columns for the swelling of the ion exchanger as with polymeric ion exchangers.

Now a method has been developed for the use of chelating silica-based ion exchangers in the removal of copper from concentrated zinc sulphate solutions. The term concentrated zinc sulphate solution is used to mean a solution where the zinc content is in the region of 30-200 g Zn/l and the copper content for instance between 100-2000 mg/l. Manufacturers offer several ion exchangers that are selective towards copper, but in this case the ion exchanger must be highly selective, because it must be taken into account that the amount of zinc in the solution may be up to 300 times that of copper. A selective ion exchanger means in particular that the ion exchanger does not remove zinc from the solution. Alternatives have been found among chelating ion exchangers that are very selective towards copper in particular, and which withstand very acidic, and also alkaline conditions, without breaking up. It has been stated that copper can be removed selectively from a concentrated solution of zinc sulphate, where the copper content is high, using a silica-based ion exchanger where the functional group was a polymeric amine. Separation of copper works best in a pH range above 3.5, preferably between 3.7-4.2. When developing the method of the present invention, the various stages that comprise copper removal by ion exchanger were also determined.

When copper removal from a $ZnSO_4$ solution is performed using a silica-based chelating ion exchanger, the various stages of the method consist of the alkaline pretreatment of the ion exchanger, the treatment of the ion exchanger with copper-free zinc sulphate solution, copper removal from the impure concentrated zinc sulphate solution with an ion exchanger selective towards copper, and the desorption of the copper i.e. the regeneration of the ion exchanger and the precipitation of copper from the regeneration solution. Copper removal based on ion exchange is performed in ion exchange columns and is preferably carried out as a continuous process.

It was found in the tests that the copper capacity of the ion exchanger in free alkaline form is considerably greater than that of an acid-treated ion exchanger. The alkaline pretreatment of the ion exchanger is carried out with a dilute alkali, e.g. 0.1 M sodium hydroxide. In alkaline pretreatment, the acid remained in the ion exchanger during acid regeneration is neutralised. The ion exchanger in question is so selective towards acid that for instance copper and zinc sulphates are unable to displace it, so the ion exchanger must be changed into the free alkaline form before the actual loading stage. The progress of alkaline pretreatment can be monitored by measuring the pH of the solution exiting the column. The alkaline feed can be stopped when the pH of the solution exiting the column approaches the pH of the alkaline solution fed into the column. After the alkaline feed the ion exchanger is washed by feeding the sufficient amount of water through the bed as is normal for ion exchanger treatment.

When developing copper removal using an ion exchanger, it was found that the manufacturer's normal recommendations, regarding alkaline treatment, copper removal and regeneration, were not suitable as such for concentrated zinc sulphate solution. When concentrated zinc sulphate solution was fed into the ion exchanger after alkaline treatment for copper removal, zinc began to precipitate in the column as a basic zinc sulphate as the pH rose. Tests carried out showed that before the actual copper removal, pretreatment of the ion exchanger is needed with a copper-free zinc sulphate solution, which has a pH of at least 2. This treatment is performed after alkaline treatment and its subsequent water rinsing. Its purpose is to charge the zinc sulphate from a slightly acidic solution into the ion exchanger in free alkaline form, thus preventing the rise in pH of the subsequent copper removal stage proper and preventing the precipitation of zinc as an alkaline zinc sulphate or other equivalent compounds. After this stage, the bed is rinsed with water, after which the bed is ready for the actual copper removal stage.

In the copper removal stage, copper-containing zinc sulphate solution or raw solution is fed into the bed at an appropriate feed rate and the ion exchanger takes the copper out of the solution selectively. The solution continues to be fed until the copper capacity of the ion exchanger is used up and the copper starts to come through the bed. After the actual copper removal stage the bed is rinsed with water and next the ion exchanger is regenerated. The ion exchanger removes copper so thoroughly from the solution that the entire process solution does not necessarily need to be treated but treatment of a sub-stream is possible, if a certain amount of copper is allowed to remain in the solution. A certain amount of copper in the solution is beneficial if the solution is routed next to cobalt removal.

The regeneration of the ion exchanger after the copper removal stage is carried out as in the prior art by treating it with a dilute solution of sulphuric acid, so that an acidic copper sulphate solution is obtained as the regeneration solution. There may also be small amounts of the following metals in the solution: Zn, Na, Mg, K, Ca, Mn, Co, Ni, Cd, and Pb. The most important thing however is to produce a solution with the minimum possible amount of zinc by means of a selective ion exchange. In this way losses of zinc are avoided in the copper removal stage of solution purification.

Removal of copper from the regeneration solution i.e. the acidic copper sulphate solution, occurs by means of sulphide precipitation. Copper and at least partially also other metals such as Co, Ni and Cd are made to precipitate as their sulphides using a reagent such as sodium sulphide $Na_2S$ or some other suitable sulphide.

It has been shown that it is possible to remove copper from a zinc sulphate solution even completely using a method based on ion exchange. Since practice has shown that a small amount of copper in the zinc sulphate solution promotes the separation of cobalt and cadmium in the subsequent process stages, it is worth leaving some copper in the solution one way or another.

The raw material of the zinc process such as zinc concentrate often contains chloride. Particularly in the method where zinc concentrate is not roasted but is leached in what is termed direct leaching, chloride removal usually has to be performed on the zinc sulphate solution generated before the solution is routed to electrolysis. As indicated in the description of the prior art, one way to remove chloride is to precipitate it using copper (I) oxide as copper chloride CuCl. Now it has been found that it is advantageous in the zinc process to combine the chloride removal process, where chloride is precipitated using copper, with the copper removal method, which is performed using ion exchanger. It is apparent in the publication of the prior art that some of the copper used in chloride removal enters the solution in divalent form. When chloride removal is combined with copper removal using an ion exchanger, the resulting divalent copper is easily removed from the solution during other copper removal without additional zinc powder consumption. It is advantageous to carry out the chloride removal method in connection with ion exchange-based copper removal, both when the Cl content of the raw solution is low and when the Cl content is high.

Removal of chloride from a concentrated zinc sulphate solution is performed by routing the desired portion of the solution first to cooling. After this, chloride removal is performed as in the prior art using copper (I) oxide or cuprous oxide, so that the chloride is precipitated as copper chloride. Return acid from electrolysis i.e. sulphuric acid solution is also fed into the solution to adjust its pH to the region of 1.5-3.9. Cuprous oxide, which is formed in a later stage of the process, is fed into the solution, whereupon the following reactions take place:

$$Cu_2O + 2HCl \rightarrow 2CuCl + H_2O \quad (4)$$

$$Cu_2O + H_2SO_4 \rightarrow Cu^{2+} + Cu^0 + H_2O + 2HSO_4^- \quad (5)$$

As seen in reaction (5), the $Cu_2O$ in the sulphuric acid solution disproportionates into divalent copper $Cu^{2+}$ and elemental copper. The copper formed is precipitated, as is the copper chloride. From the reactions one can also deduce that the chloride content of the solution after the chloride removal stage determines the $Cu^{2+}$ content of the exiting solution. So if one wishes to make the chloride content low, correspondingly divalent copper will be generated in the solution. The Cu content of the solution from chloride removal that is routed to the ion exchanger is preferably between 500-5000 mg/l. The amount of divalent copper in the solution can be adjusted by regulating the amount of cuprous oxide fed into the chloride removal stage, the temperature and the pH of the solution. The rate of progression of the reactions increases when the amount of cuprous oxide in the solution is high or when the pH is low.

The solution has to be cooled for chloride removal to a temperature of maximum 45° C. Chloride removal works best at temperatures between 30-40° C. When the solution has been cooled, it can be routed after chloride removal to copper removal, since the ion exchanger also works well at the temperatures for chloride removal. In chloride removal using copper the amount of soluble copper depends on how low the final Cl content of the solution is required to be. The ion exchanger described above also works well at a high copper content, so it is advantageous to feed the solution from chloride removal at least partially to copper removal using an ion exchanger.

Chloride removal can be approached in two ways: first, only a part of the solution can be taken into a sidestream and the chloride removed from it down to the lowest possible level, 40-150 mg/l. The other alternative is to route the whole stream through chloride removal, but to remove only some of the chloride, i.e. the Cl content would remain around 150-200 mg/l. The result of the first alternative is that the amount of copper in the solution rises considerably. In the second option there is no need to cool the solution than to a temperature about 45° C., since partial chloride removal can be accomplished even at that temperature. When determining the degree of chloride removal it should also be borne in mind that there is also copper in the solution going to the next solution purification stage. Therefore for example the first method mentioned is preferred, in which only a certain part of the raw solution circulates via chloride removal and ion exchange-based copper removal. In this case part of the raw solution is routed directly to the following solution purification stage and this part contains the copper needed there. The copper can be removed almost completely from the solution circulating via the chloride removal stage using an ion exchanger.

The metallic copper formed in connection with chloride removal remains in the copper chloride precipitate and the divalent copper is in the solution. The copper chloride-copper precipitate generated is separated from the solution and can be treated with a suitable alkali such as lye, NaOH, in order to convert copper chloride back into cuprous oxide. An amount of precipitate corresponding to the cuprous oxide generated is routed back to the chloride removal stage. The rest of the precipitate is removed and combined with the precipitate formed during ion-exchange sulphide precipitation. The solution containing NaCl is routed out of the process. The precipitate can also be returned in its entirety as explained in the patent of the prior art. It is clear to an expert, however, that not all the reactions are fully in balance, so that it is preferable to remove some of the precipitate at this stage.

The cuprous oxide generated in the alkaline treatment of copper chloride is not always sufficient to precipitate all the chloride and so a small amount of the raw solution is routed into a sidestream, in which the metallic copper is precipitated from it using zinc powder. When the copper reacts further with copper sulphate, cuprous oxide is formed, which is routed to the chloride removal stage:

$$CuSO_4 + Zn^0 \rightarrow ZnSO_4 + Cu^0 \qquad (6)$$

$$CuSO_4 + Cu^0 + H_2O \rightarrow Cu_2O + H_2SO_4 \qquad (7)$$

Combining the chloride removal stage with the ion-exchange copper removal stage gives rise to at least the following benefits:

The temperature of the solution from the chloride removal stage is suitable for the ion exchange stage.

In the chloride removal stage the copper content of the solution rises in comparison with that of the raw solution. A high copper content of the solution is advantageous to the ion exchange method, but in the conventional method it means increased zinc powder consumption, which is avoided in order to keep costs down.

The pH of the solution from the chloride removal stage is at a beneficial level for the ion exchange method, but too low for the conventional copper removal method. When copper removal is performed after chloride removal in the conventional manner, the pH of the solution should be raised before it can be routed to copper removal using zinc powder. This means the feed of some alkali into the process, which again raises production costs. The ion exchange method works in a wide range of pH values and its pH adjustment does not need to be as precise as in the conventional method.

DETAILED EXPLANATION OF INVENTION

Figure 1:
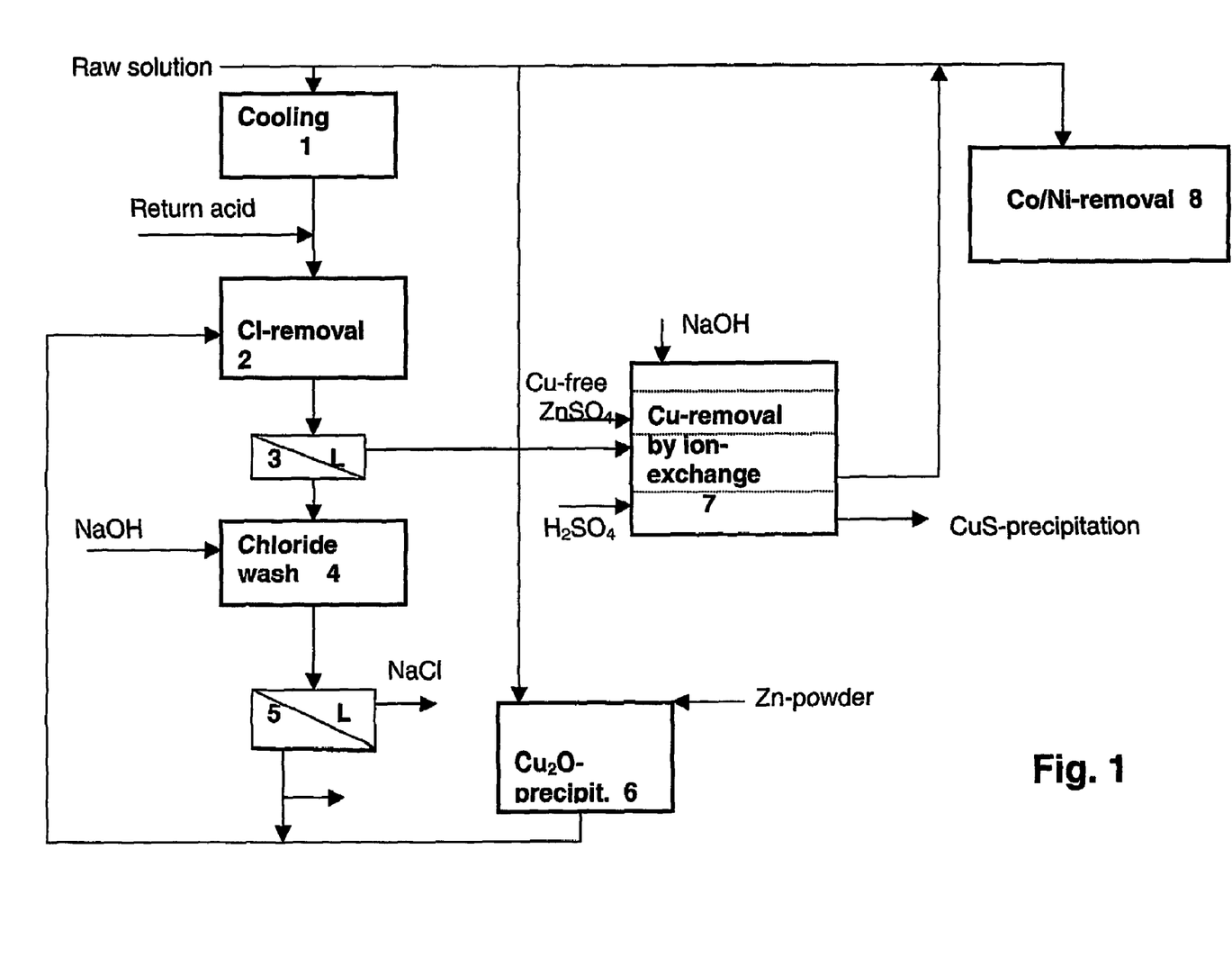
FIG. 1 is a flow chart which presents one preferred embodiment of the process.

FIG. 1 presents one preferred method of carrying out chloride and copper removal from a concentrated zinc sulphate solution or raw solution. In the method a part of the raw solution from solution purification is routed to cooling 1, where the solution is cooled down to a temperature of 30-45° C. The quantity of raw solution to go to chloride removal depends on the chloride content of the solution, in that it is not advisable that the chloride content of the solution going to electrolysis exceeds 200 mg/l. After cooling, the electrolysis return acid i.e. a solution containing sulphuric acid, is fed into the solution so that the pH of the solution is suitable for chloride removal. In the US patent a suitable region is defined as a pH below 2.6, but we have found that an operating range between 1.5-3.9 is suitable.

In the chloride removal stage 2, cuprous oxide $Cu_2O$ is fed into the solution, and it precipitates the chloride in the solution in accordance with reactions 4 and 5 above. The copper-containing precipitate is separated from the solution in solids separation 3. The solution generated in separation is routed to copper removal and the underflow to chloride washing 4. In the washing stage the chlorides are washed out of the precipitate using a suitable hydroxide such as sodium hydroxide, whereby a soluble sodium chloride and cuprous oxide-copper precipitate is generated. After washing another solids separation step is performed 5. Part of the underflow formed in separation is recirculated to chloride removal 2 and part is removed for combining with the precipitate generated during ion exchange treatment (not shown in detail in the diagram). The NaCl-containing solution is removed from the process.

Since the amount of oxide formed in chloride washing is not enough for the total requirement of the chloride removal stage, the additional demand is met by routing a small amount of the raw solution to another sidestream. Cuprous oxide is formed in the sidestream in the $Cu_2O$ precipitation stage 6 by precipitating the copper out of the raw solution using zinc powder. The cuprous oxide that is formed is routed with the oxide generated in chloride washing to chloride washing stage 2.

The zinc sulphate solution from solids separation 3 after the chloride removal stage is routed to copper removal stage 7, where copper is removed using an ion exchanger. If necessary, the pH of the solution is adjusted with a suitable addition of alkali (not shown). The various steps of the ion exchange stage are marked on the diagram by a broken line, (alkaline pretreatment, treatment with copper-free zinc sulphate solution, copper removal and regeneration). In practice the stages described above occur consecutively in the same columns. The copper-free solution coming from the ion exchange stage is combined with the raw solution, and the combined solution is fed to cobalt removal stage 8. The copper is removed almost completely from the solution going through the ion exchanger, but the amount of copper in the raw solution is sufficient for the cobalt removal stage. The regeneration solution from the ion exchange stage is routed to sulphide precipitation.

EXAMPLES

Example 1

Figure 2:
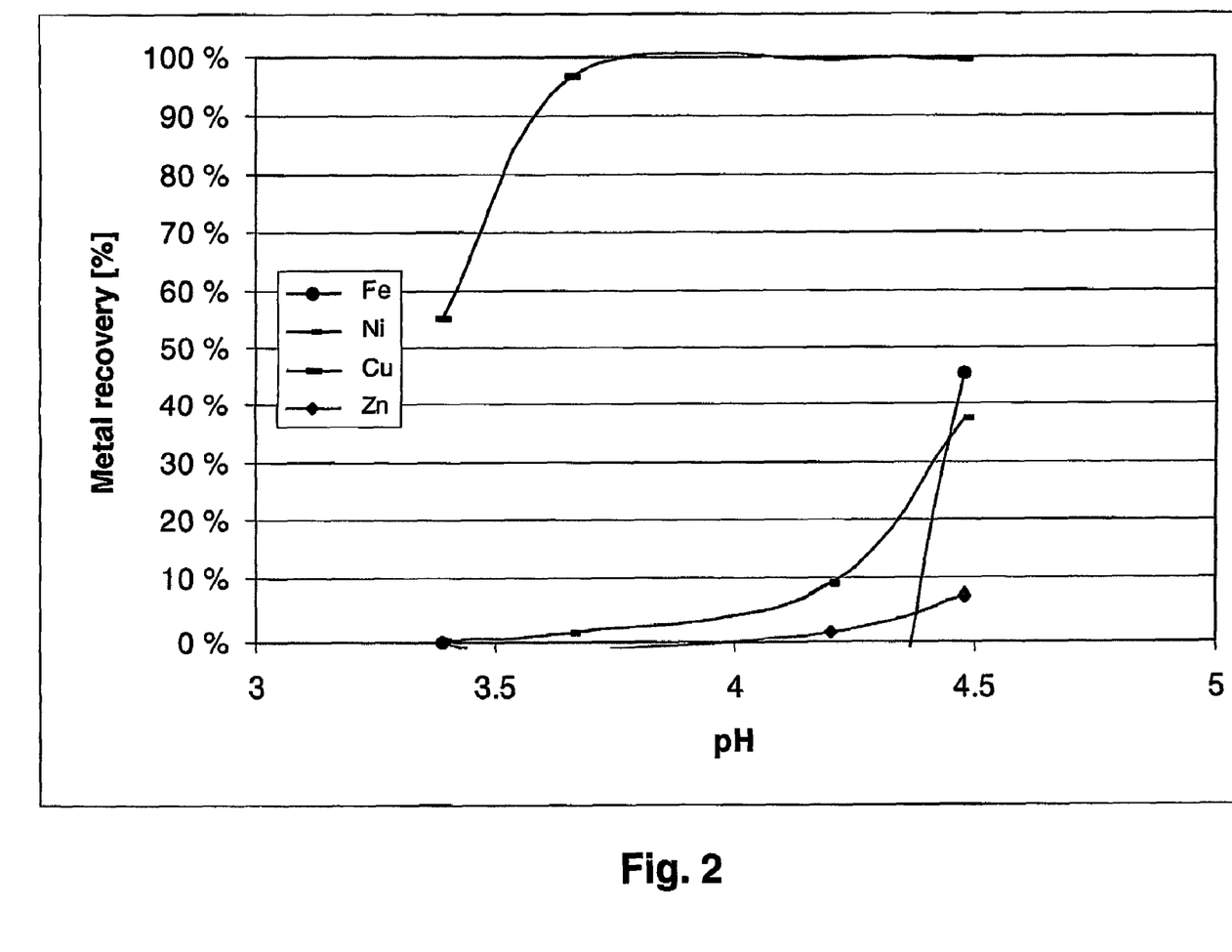
FIG. 2 is a graph that represents the recovery percent of various metals as a function of the pH of the zinc sulphate solution, using a certain ion exchanger in accordance with the invention.

In the test it was used a chelating ion exchanger, which had an alkyl-silylated silica base. In the case of the example a branched polyethylene imine is the functional group. The test was carried out at room temperature. The ion exchanger mentioned above was used in the ion exchanger equilibrium tests shown in FIG. 2. The graph shows that the resin is extremely selective in relation to copper in the pH range 3.5-4.2, when there is very little separation of other metals, particularly zinc. In column tests the ion exchanger formed a bed in the column, through which various solutions were run. Bed volume (BV) means the total volume of the ion exchange bed in the column including empty space.

Figure 3:
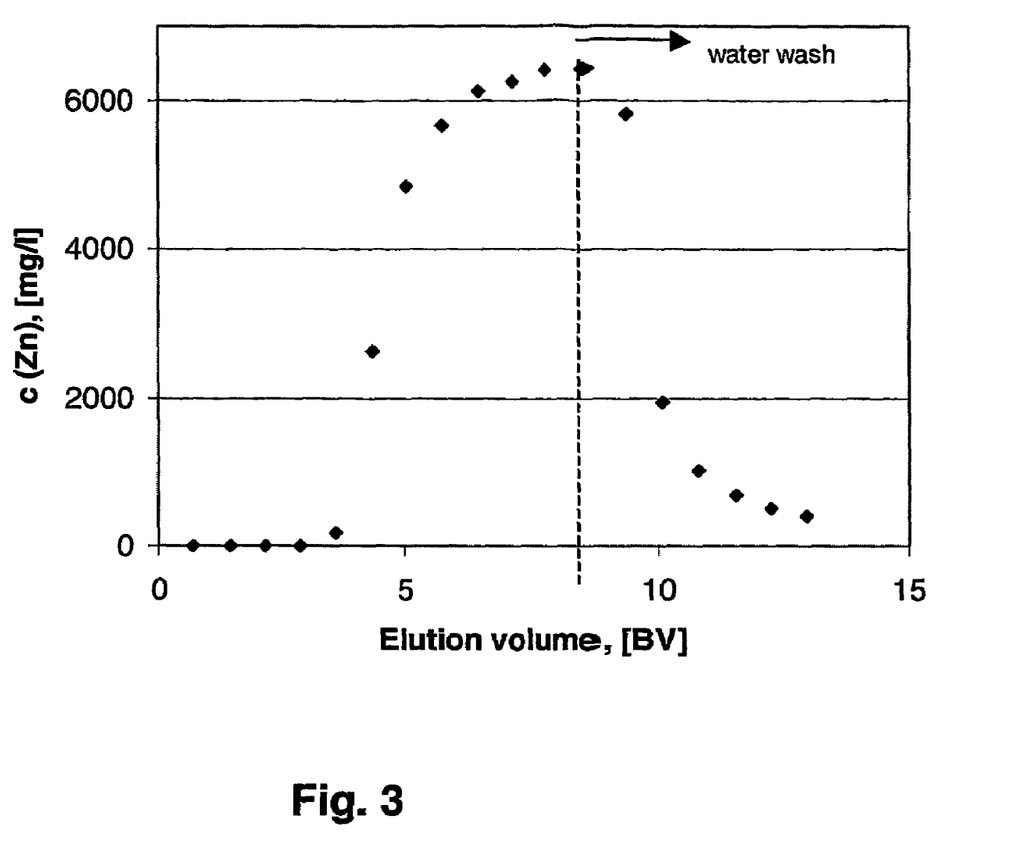
FIG. 3 shows the breakthrough curve of zinc as a function of the elution volume, when a certain ion exchanger in accordance with the invention is used.

In the alkaline-$ZnSO_4$-pretreatment 0.1 M NaOH was poured through the acid-form ion exchanger until the pH of the solution exiting the column was 12. After this the ion exchanger was washed with about 8 times the bed volume of water and after rinsing, a copper-free $ZnSO_4$-solution was run through the ion exchanger (pH 4.9 and 7.2 g Zn/l). At the end of the pre-treatment stage, the ion exchanger was again washed with about 8 times the bed volume of water. FIG. 3 shows the breakthrough curve of zinc as a function of the amount of solution from the column (elution volume), when a dilute solution of copper-free zinc sulphate was fed into the bed. The tests showed that if a concentrated solution of zinc sulphate (raw solution) is poured through the bed immediately after the alkaline treatment, an alkaline zinc sulphate begins to form in the bed, which is precipitated in a concentrated zinc sulphate solution at a pH of about 5.5.

Figure 4:
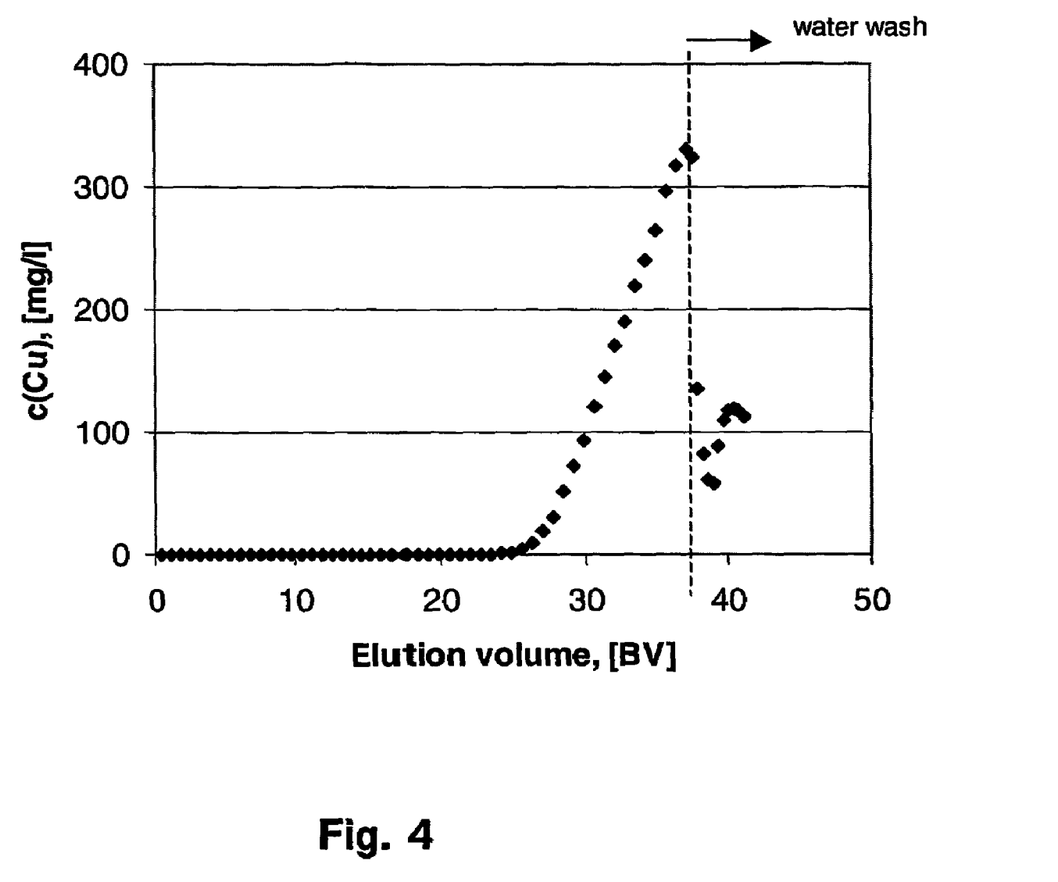
FIG. 4 shows the breakthrough curve of copper as a function of the elution volume, when an ion exchanger is used according to FIGS. 2 and 3.

After pretreatment with a dilute zinc sulphate solution a solution of $ZnSO_4$ with a pH of 4.9, zinc content of 182 g Zn/l and copper content of 624 mg Cu/l was fed into the bed. FIG. 4 presents the breakthrough curve of copper. The figure shows that the copper starts to come through the column at a bed volume of around 28. This shows that alkaline regeneration in conjunction with $ZnSO_4$-pretreatment gives good copper capacity to the used ion exchanger. The zinc breakthrough curve is not shown, but according to the charging results alkaline regeneration does not significantly add zinc adsorption to the ion exchanger; in fact it immediately starts to come through the bed.

Figure 5:
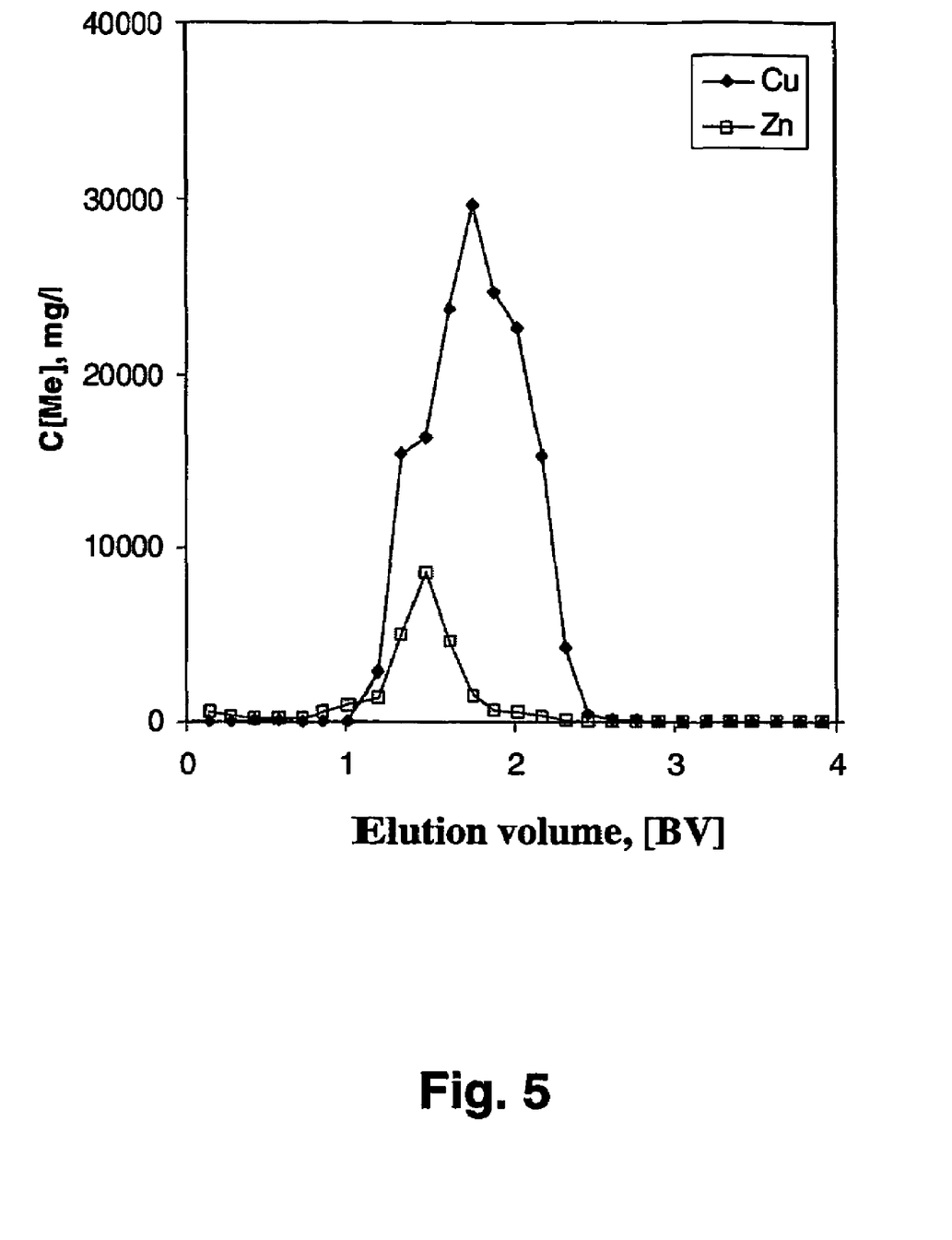
FIG. 5 presents the copper and zinc content of the regeneration solution as a function of the elution volume.

FIG. 5 presents the zinc and copper content of the exiting solution when a copper-charged ion exchanger was regenerated with a 1 M $H_2SO_4$ solution. Based on the regeneration results, the copper capacity of the ion exchanger used was calculated to 37.7 mg Cu/g. As the precipitate was regenerated it dissolved and the copper was released during regeneration. The regeneration of copper from the ion exchanger was very successful with 1 M $H_2SO_4$. The ion exchanger was found to have excellent acid selectivity particularly in comparison with copper and zinc. The success of regeneration was also confirmed when analysing the amounts of metals in the regenerated ion exchanger.

Example 2

The copper content of the raw solution, i.e. zinc sulphate solution entering solution purification is 1000 mg/l and the chloride content 200 mg/l. 63% of the raw solution is sent for cooling prior to chloride removal. The solution is cooled down to 40° C. Return acid from electrolysis is fed into the cooled solution in the proportion of about 1% of the amount of raw solution, and this enables the adjustment of the pH to a value of 2.9.

Slurry that contains cuprous oxide, $Cu_2O$, from later stages is fed into the solution in the chloride removal stage to remove the chlorides as copper chloride. The amount of copper in the cuprous oxide slurry is 22% of the amount of copper in the raw solution and the solution volume is 19% of the total amount of raw solution.

The chloride removal stage is followed by solids separation, from which the solution obtained is routed to copper removal by ion exchanger. The amount of solution entering copper removal is at this point 82% of the amount of raw solution, its copper content has risen to 1200 mg/l and the chloride content has fallen to 140 mg/l. The amount of underflow from solids separation is only 1% of the amount of raw solution. The underflow is routed to chloride washing with sodium hydroxide, where the copper chloride is converted to cuprous oxide, metallic copper and sodium chloride. The amount of NaOH to be fed naturally depends on the amount of chloride in the underflow. The chloride removal stage is followed by solids separation, where an amount of the sodium chloride that is formed is removed that is equivalent to the amount of lye fed into the washing stage. About half of the solids are removed from circulation and the other half are routed to chloride removal.

Since the underflow from post-chloride washing solids separation also partially contains some elemental copper, which does not react in chloride removal, an amount of underflow equivalent to the amount of copper is removed from circulation. This also means that the part of the underflow recirculated back to chloride removal is not enough to remove the desired amount of chloride from the raw solution. In order to achieve an adequate chloride removal, part of the raw solution, 19% of the total amount of the raw solution, is fed to cuprous oxide precipitation. The copper of the raw solution stage is converted in the oxide precipitation stage with the aid of zinc powder to monovalent copper oxide $Cu_2O$. The amount of needed zinc powder is about 1.05 times to the amount of copper in the solution. The generated cuprous oxide precipitate is routed to chloride removal.

Copper removal from the raw solution is performed in the way described in Example 1. As a result of ion exchange, a solution is formed where the copper content is about 1 mg/l and the chloride content 140 mg/l. The generated solution is combined with the raw solution and is routed to the cobalt/nickel removal stage. The copper sulphide precipitate formed in the connection of ion exchange stage is removed from circulation and combined with the underflow formed in the solids separation of the chloride removal. The combined precipitate is routed to an appropriate copper recovering system.

The invention claimed is:

1. A method for the removal of copper from a concentrated chloride-containing zinc sulphate solution known as raw solution that is going to an electrolytic preparation of zinc, using an ion exchanger, comprising:
routing at least some of the raw solution to an ion exchange stage for copper removal, wherein the copper removal takes place using a chelating alkyl-silylated silica-based ion exchanger, of which a functional group is a polymeric amine and which does not remove zinc from the raw solution, and
routing the raw solution from which the copper has been removed to a subsequent stage of solution purification.

2. A method according to claim 1, wherein the ion exchange stage comprises an alkaline pretreatment of the ion exchanger, treatment with a copper-free zinc sulphate solution containing less than 30 g Zn/l, the copper removal, regeneration of the ion exchanger and separation of copper from the regeneration solution.

3. A method according to claim 1, wherein the zinc content of the raw solution is in the range of 30-200 g/l.

4. A method according to claim 1, wherein the copper content of the raw solution routed to the ion exchange stage is in the range of 100-2000 mg/l.

5. A method according to claim 2, wherein the treatment of the ion exchanger occurs with copper-free zinc sulphate solution, which has a pH of at least 2.

6. A method according to claim 2, wherein the copper removal with ion exchanger occurs at a pH of over 3.5.

7. A method according to claim 6, wherein the copper removal with an ion exchanger occurs at a pH of 3.7-4.2.

8. A method according to claim 2, wherein the copper separation from the regeneration solution is carried out as sulphide precipitation.

9. A method according to claim 1, wherein the polymeric amine acting as the functional group of the ion exchanger is a polyethylene imine.

10. A method according to claim 1, wherein before copper removal with an ion exchanger at least some of the raw solution is routed to a chloride removal stage.

11. A method according to claim 10, wherein before chloride removal the raw solution is cooled to a temperature of maximum 45° C.

12. A method according to claim 10, wherein before chloride removal the pH of the raw solution is adjusted to the range of 1.5-3.9.

13. A method according to claim 10, wherein chloride removal is performed using cuprous oxide so that the chloride in the raw solution is precipitated as copper chloride.

14. A method according to claim 13, wherein copper chloride is separated from the raw solution and converted with alkali back to cuprous oxide, which is at least partially routed back to chloride removal.

15. A method according to claim 10, wherein part of the raw solution is routed to cuprous oxide precipitation, where the copper in the raw solution is made to react with zinc powder to form cuprous oxide, and the cuprous oxide generated is routed to the chloride removal stage.

16. A method according to claim 10, wherein the copper content of the raw solution routed from the chloride removal stage to copper removal is in the range of 500-5000 mg/l.

17. A method for the removal of copper and chloride from a chloride-containing concentrated zinc sulphate solution known as raw solution that is going to an electrolytic preparation of zinc, comprising:
routing at least some of the raw solution to cooling, where the raw solution is cooled to a temperature of 30-45° C. and the pH is adjusted to the range 1.5-3.9,
subsequently routing the raw solution which has been cooled to chloride removal, which is performed with cuprous oxide whereby the chloride in the raw solution is precipitated as copper chloride;
separating the copper chloride from the raw solution
routing the raw solution at least partially to an ion exchange step for copper removal, wherein the copper removal occurs using a chelating alkyl-silylated silica-based ion exchanger, of which a polymeric amine acts as a functional group and which does not remove zinc from the raw solution, and where the ion exchange step comprises an alkaline pretreatment of the ion exchanger, treatment with copper-free zinc sulphate solution, copper removal, a regeneration of the ion exchanger and a separation of copper from the regeneration solution, and
routing the raw solution from which chloride and copper have been removed to a following stage of solution purification.

18. A method according to claim 17, wherein the copper chloride is separated from the raw solution and converted using an alkali back to cuprous oxide, which is at least partially routed back to chloride removal.

19. A method according to claim 17, wherein some of the raw solution is routed to cuprous oxide precipitation, where the copper in the raw solution is made to react with zinc powder to form cuprous oxide, and the cuprous oxide generated is routed to the chloride removal stage.

20. A method according to claim 17, wherein the zinc content of the raw solution is in the range of 30-200 g/l.

21. A method according to claim 17, wherein the copper content of the raw solution routed to the ion exchange step is in the range of 500-5000 mg/l.

22. A method according to claim 17, wherein the treatment of the ion exchanger occurs with copper-free zinc sulphate solution, which has a pH of at least 2.

23. A method according to claim 17, wherein the copper removal with an ion exchanger occurs at a pH value of over 3.5.

24. A method according to claim 23, wherein the copper removal with an ion exchanger occurs at a pH value of 3.7-4.2.

25. A method according to claim 17, wherein the copper separation from the regeneration solution is carried out as sulphide precipitation.

26. A method according to claim 17, wherein the polymeric amine acting as the functional group of the ion exchanger is a polyethylene imine.

* * * * *